Figure 1:
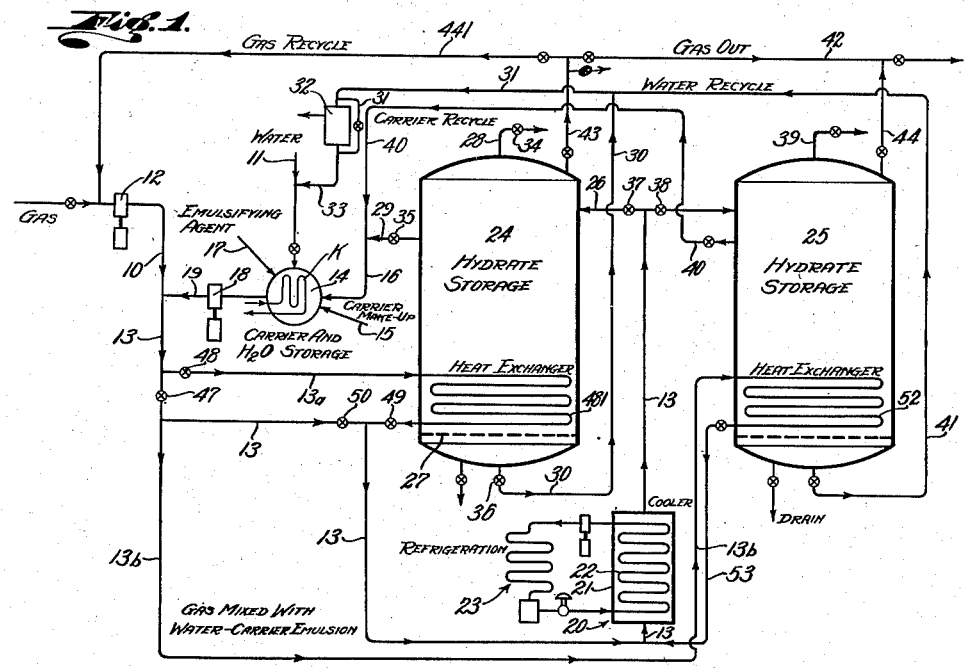

May 8, 1945.  A. J. L. HUTCHINSON ET AL  2,375,559

TREATMENT OF HYDROCARBON GASES BY HYDRATION

Filed Oct. 20, 1941

Inventors
Arthur J. L. Hutchinson
and Ira C. Bechtold

H. Calvin White
Attorney

Patented May 8, 1945

2,375,559

UNITED STATES PATENT OFFICE 2,375,559

TREATMENT OF HYDROCARBON GASES BY HYDRATION

Arthur J. L. Hutchinson and Ira C. Bechtold, Los Angeles, Calif., assignors to The Fluor Corporation, Ltd., Los Angeles, Calif., a corporation of California Application October 20, 1941, Serial No. 415,686

16 Claims. (Cl. 48—190)

This invention has to do with improved processes applicable generally to the treatment of various gases or mixtures of gases partially or entirely capable of conversion into solid hydrates, i. e., water-addition products. Typical of such gases are natural gas, oil refinery (straight-run or cracked) gases, and various other industrial gases, all of which may be characterized as hydrocarbon gases but which may contain non-hydrocarbon constituents capable of hydration, such as carbon dioxide, hydrogen sulphide, and sulphur dioxide. It will be understood that the invention is principally concerned with improved systems for forming the hydrates and separating the latter from non-hydrated fluid constituents of the gas, and it is contemplated that after their formation and separation, the solid hydrates may be used or further treated to serve the requirements of any particular purpose.

Generally speaking, the convertible constituents of the gases are transformed into their solid hydrates by maintaining the gas in intimate admixture with water under temperature and pressure conditions at which the hydrates will form. These conditions may of course vary within rather wide limits, depending upon the particular constituent or constituents of the gas to be hydrated. As an example, hydrates of the hydrocarbon series methane, ethane, propane, and butane (including isomers) may be converted to their solid hydrates at temperatures from about 35° F. to 40° F. and under pressures ranging, say, from 25 to 650 lbs. per sq. in. gauge. It is understood, of course, that particular gases or mixtures thereof may be convertible at selected combinations of temperature and pressure within the above ranges. Hydrates of non-hydrocarbon constituents of the gas, e. g., carbon dioxide, hydrogen sulphide, and sulphur dioxide, may form along with the hydrocarbon hydrates although the temperatures and pressures actually required for hydration of the non-hydrocarbon compounds may be considerably lower, or higher, than those required for conversion of the hydrocarbons.

Formation of the hydrates may be employed for such typical purposes as storage of the hydrated compounds, as later explained; or to secure separation of relatively low boiling hydratable constituents of the gas from high boiling fractions incapable of hydration, as in natural gasoline refining explained in our copending application Serial No. 416,774, entitled Treatment of gaseous hydrocarbons, and filed October 27, 1941; or for purposes of fractionation and pressure generation described in the application of Arthur J. L. Hutchinson, Ser. No. 392,186, filed May 6, 1941, on Fractionation of hydrate-forming hydrocarbons; or to obtain a molecular concentration of a constituent of the gas to be treated with a reagent, as explained in our copending application entitled Treatment of gases, Serial No. 416,774, filed October 27, 1941.

It has been determined that the efficiency and completeness of hydrate formation are enhanced by maintaining the gas and water mixture in a state of active or turbulent agitation, effects of which are to increase surface contacts between the gas and water, maintain the water particles in a state of fine division, promote formation of the hydrate crystals, and facilitate dispersion or entrainment and movement of the hydrates in the fluid stream. In accordance with the invention, we have provided an improved method for satisfying these conditions, whereby the gas and water are introduced into an elongated passage of relatively small cross-sectional area at a rate such that an intimate mixture of the gas and water fills the passage and assumes turbulent flow therethrough. By proper control of the mixing temperature, with or without precooling the gas and water prior to their introduction to the mixing passage, and by maintaining the mixture stream under a pressure required for conversion of all constituents of the gas desired to be hydrated, complete hydration of such constituents occurs during the course of flow through the mixing passage. The turbulence of flow effectively entrains all the hydrate crystals at the instant of their formation, permitting continuous and complete removal of solid, as well as fluid, phases of the stream into a zone of separation. As will be apparent, one outstanding advantage of the system is its complete simplicity from standpoints both of equipment and method of operation.

The invention contemplates various additional expedients tending to secure such advantages as maximum and controllable degree of dispersion and particle size of the water admixed with the gas, and the removal from the mixture stream of heat of hydrate formation which otherwise might inhibit hydration or otherwise adversely affect the mixing operation. It is found that maintenance of the water in a state of fine division desirable for the formation of small-size hydrate crystals, may be aided by the presence in the water-gas mixture of a non-aqueous carrier liquid, preferably a petroleum fraction such as kerosene distillate, or perhaps gas oil corresponding somewhat more closely to the specific gravity of the hydrate. The carrier liquid serves not only as a dispersing medium for the water, but also, as the term implies, as a carrier medium for transferring the hydrates from their locus of formation to any other zone for storage or further treatment according to the ultimate purpose of the process.

As a further aid in promoting fine particle size dispersion of the water and resultant formation of small hydrate crystals, we propose to use an emulsifying agent which may be introduced in any suitable manner to the water-gas mixture. Ordinarily it will be preferred to mix the emulsifying agent with the water or carrier liquid, or both, prior to their injection into the gas stream.

Further features are contemplated, such as cooling the mixture in the elongated mixing passage, either indirectly by external application of a cooling medium, or internally by injecting a cooling fluid directly into the mixture. For the latter purpose, we may introduce to the mixture stream at one or more locations a cold non-aqueous carrier liquid, all as will hereinafter appear. It is also contemplated that the mixture stream may be cooled, or maintained within proper temperature limits, by the introduction of ice particles which have capacity for compensating, by their heat of fusion, for heat of formation of the hydrates, in order to keep the temperature of the stream desirably low. Any of these methods of cooling the water-gas mixture may be employed to maintain the stream at temperatures permitting complete formation of the hydrates.

Figure 2:
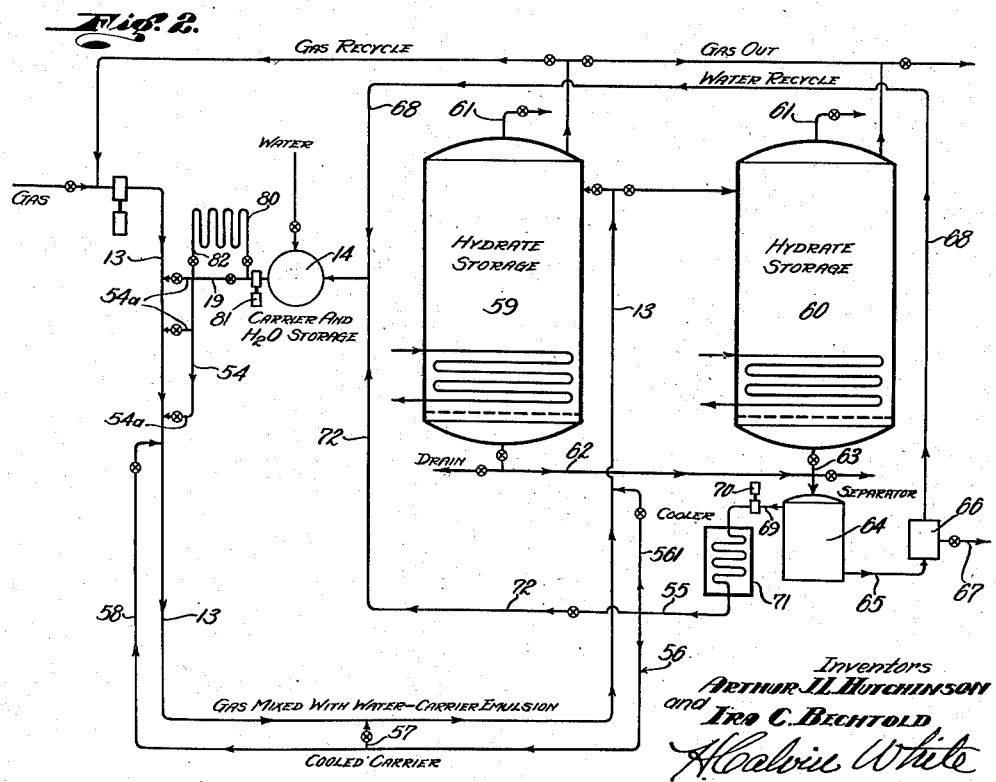

The details of the process will be understood to better advantage from the following description of certain typical hydrate-forming systems embodying the invention, as shown in the accompanying drawing, in which:

Fig. 1 illustrates diagrammatically and in flow sheet form one method involving indirect cooling of the mixing passage; and Fig. 2 is a similar view representing, among other differences, recirculation of the cooled carrier liquid directly into the mixing passage for purposes of internal cooling.

The gas and water introduced to the system through lines 10 and 11 may individually or both be precooled so that the mixture will fall within the temperature range required for hydrate formation under the existing pressure. The gas stream is forced by compressor 12 through an elongated mixing passage comprising a pipe 13 which may be of any desired length, depending upon time factors and the necessary turbulent flow of the water and gas mixture during the hydrate formation stage. Ordinarily the capacity of the system will determine the diameter of the mixing pipe 13, although its cross-sectional area will in any event be small as compared with the length of the passage. The water may be introduced through line 11 to a suitable container 14, wherein the water may be mixed (and, if desired, cooled by coil K) with carrier liquid introduced through line 15 or recirculated through line 16, where it is desired to use a carrier liquid and to introduce same at the initial stage of water-gas mixing. When an emulsifying agent is to be used, the agent also may be introduced with the water or into the container 14, as through line 17.

The water and any added carrier liquid or emulsifying agent are injected by pump 18 through line 19 into the gas stream in the mixing passage 13, wherein the combined fluids flow at a rate sufficient to fill completely the passage and pass at fairly high velocity in a state of turbulent flow. Incipient hydrate formation occurs immediately upon mixing of the gas and water, and continues toward complete conversion of the gas constituents capable of hydration under the existing temperature and pressure conditions, along the course of flow of the mixture in line 13. Formation of the hydrates develops heat, i. e., heat of hydrate formation, which it may be desirable to remove from the mixture stream in order that the temperature of the stream may be kept sufficiently low to assure maximum conversion into their hydrates of all hydrate-forming constituents of the gas. For this purpose, the mixture may be passed through a suitable cooling zone 20, shown typically as comprising a vessel 21 containing a pipe coil 22 through which cooling fluid is circulated from a refrigeration system diagrammatically indicated at 23.

The fluid-hydrate stream from cooler 20 may be treated in any desired manner to separate the hydrates from fluid constituents of the stream, and then to dispose further of the separated phases according to particular purposes to be served. Merely as illustrative, we have shown the hydrates to be delivered for storage in one or more tanks or containers 24, 25, any desired number of which may be filled with the hydrates successively or alternately. As an example of the latter type of operation, the mixing passage stream may first be discharged through line 26 into storage vessel 24, wherein the solid hydrates settle and accumulate as a body supported on an apertured or liquid-permeable floor 27. Gaseous or uncondensed constituents of the mixture may be withdrawn through valved line 28, and liquid constituents separated from the solid hydrates in any suitable manner, as by withdrawing the lower specific gravity carrier liquid through line 29 from the storage zone at a high elevation and taking off any residual water and emulsifying agent from the bottom of the vessel through line 30. The separated carrier liquid may be recirculated through line 16 to container 14, and the water and emulsifying agent recirculated through lines 30 and 31 to tank 14. Suitable equipment, diagrammatically indicated at 32, may be employed for separating spent emulsifying agent from the water, should it be found desirable to do so, and for returning the water through line 33 to storage 14.

When vessel 24 is filled with hydrates, valves 34, 35, and 36 may be closed and the hydrate body cooled or refrigerated by suitable means (not shown) to maintain the hydrates in stabilized condition for storage. By closing valve 37 and opening valve 38, the flow from the mixing passage 13 may be diverted into storage vessel 25 and a second body of hydrates accumulated therein, as explained with reference to storage vessel 24. Gases and uncondensed vapors are withdrawn through line 39 and carrier liquid and residual water recirculated, respectively, through lines 40 and 41. At such time as it is desired to utilize the gas stored in hydrated form in the vessels 24 and 25, the hydrates may be decomposed, as by heating, and the liberated gas discharged to line 42 through outlets 43 and 44. It may be mentioned that, if desired, while the vessels 24 and 25 are being filled with hydrates, all or part of the uncondensed gases and vapors may be recirculated to the mixing passage 13 through line 441 from the outlets 43, 44 and line 42, by proper manipulation of the various valves illustrated.

Another purpose may be served by the gas recycle connection 441 with the mixing passage 13, in that this arrangement permits recycling gas liberated by limited decomposition of the stored hydrates to maintain the hydrate beds at low stabilizing temperature. Depending upon the thermal efficiency of the vessels 24 and 25, more or less atmospheric heat will be transferred to the hydrates in storage, resulting of course in an increase in the hydrate vapor pressure and a tendency for some of the hydrates to decompose. By venting off relatively small amounts of gas through line 43 or line 44 to the gas recycle line 441, a small percentage of the hydrates may be decomposed so that their heat of decomposition, supplied from the hydrate masses, will maintain their temperatures desirably low.

Provision may be made whereby a portion or all of the heat required to decompose the hydrates in vessels 24 and 25 may be supplied by the mixing passage stream, thus utilizing the decomposition of previously formed hydrates as a means of removing heat of formation of hydrates subsequently forming in the mixing passage. Assuming the mixture in line 13 to be discharged into vessel 25 and that it is desirable simultaneously to decompose the hydrates in vessel 24, by closing valve 47 and opening valve 48 the mixing passage stream may be diverted through line 13a into heat exchanger 481 to supply heat to the hydrates being dissociated. The mixing passage stream then flows from the heat exchanger 481 into line 13, valve 49 being opened and valve 50 closed. When the hydrates are to be decomposed in vessel 25, the mixing passage flow occurs through line 13b, valves 48 and 50 being closed, into heat exchanger 52 and then through line 53 into line 13 leading to the cooler 22.

Instead of serving to transfer heat from the gas-water mixture in stream 13 to decompose the stored or accumulated hydrates, heat exchangers 481 and 52 may similarly be used to cool the mixing passage stream by heat transference to ice bodies retained in the storage vessel after release of the gas. By liberating gas from the storage vessels without heating the hydrates, as by merely opening the valves in the outlet lines 28 and 39 to reduce the pressure in the storage vessels, the hydrates will decompose by virtue of the pressure reduction alone and heat of fusion or decomposition will be supplied from the residual water. The latter may be caused to freeze and remain as ice bodies in the storage vessels. By diverting the mixing passage stream through the heat exchangers 481 and 52 after formation of the ice bodies, considerable cooling of the mixing passage stream may be effected by the transference of heat to melt the ice.

The system shown in Fig. 2 is generally similar to the flow diagram of Fig. 1, but differs principally with respect to the conditions under which the water and carrier liquid are admixed with the gas in the elongated mixing passage. As before, the gas introduced to the mixing passage 13 is mixed with water, with or without carrier liquid and emulsifying agent, taken from storage 14 through line 19. Under certain conditions it may be desirable to contact the gas with water introduced at successive locations or stages in the mixing passage, and for this purpose, line 19 is shown to connect with a water supply manifold 54 from which individual streams of water in controllable amounts may be introduced to any suitably spaced points along the mixing passage, through valved branches 54a.

Instead of removing the heat of hydrate formation by indirect cooling of the mixing passage stream as in Fig. 1, the system of Fig. 2 contemplates direct cooling of the mixture by introducing a cooling medium into the mixing passage. As previously indicated, it is contemplated that a portion or all of the water to be mixed with the gas may be introduced to the mixing passage in the form of ice particles or crystals. To illustrate one method adapted to serve the purpose, Fig. 2 shows a cooler at 80 through which a portion or all of the water-carrier liquid mixture may be forced by pump 81 to cool the mixture to a temperature at which the dispersed water particles will be frozen into ice crystals. The latter are returned in the carrier liquid stream through line 82 to be introduced at one or more locations 54a into the mixing passage stream. By this method the injected stream is given considerable cooling capacity either to lower the temperature of the mixing passage stream or to compensate for the heat of hydrate formation, by virtue of the heat of fusion of the ice particles.

We have also referred to the possibility of injecting into the mixing passage a cooling fluid independent of the initially admixed water and gas streams. This cooling fluid desirably may consist of the non-aqueous carrier liquid derived from a storage zone or from subsequent separation of the stream discharged from the mixing passage, as will presently appear. It is also contemplated that individual streams of the cooling fluid may be introduced to the mixing passage at successive locations, thus causing the water and gas mixture to be cooled in stages, and where the cooling fluid consists of carrier liquid, to have stage dilution by the carrier liquid to aid in the transference of the progressively forming hydrates. As illustrative, carrier liquid that may have been cooled to a temperature approaching, or even below the freezing temperature of water, is introduced through line 55 to a manifold 56 from which the liquid is discharged into spaced locations along the mixing passage through valve branches 561, 57, and 58.

From passage 13 the hydrate and carrier liquid mixture is discharged into one or the other of storage vessels 59 and 60, from which gases and uncondensed vapors are vented through the outlets 61. The hydrates are collected in the storage vessels and the carrier liquid, together with any residual water and emulsifying agent, is withdrawn through the bottom outlets 62 or 63 to a separator 64, within which the water and emulsifying agent gravitate to the bottom. The water is withdrawn through line 65 for treatment at 66 to separate the emulsifying agent which is withdrawn through line 67, permitting recirculation of the water to the storage vessel 14 through line 68. The carrier oil is withdrawn from the separator 64 through line 69, and is forced by pump 70 through a cooler 71 from which the cooled carrier passes to line 55. Any recirculated carrier liquid in excess of the quantity to be introduced to the mixing passage may be recirculated to vessel 14 through line 72.

We have referred to the use of emulsifying agents to aid in promoting fine particle dispersion of the water admixed with the gas to be hydrated. Any suitable emulsifying agents, of which many are known, may be used. Typical agents are the commonly used organic salts and fatty acid soaps which can effectively emulsify the water and carrier liquid. We may prefer, however, to particularly form the emulsion to throw the water into the disperse phase, so that fine particles or droplets of the water are enveloped in a continuous phase of the carrier oil. For this purpose, the emulsifying agent may be particularly selected to form a water-in-oil form of emulsion, from such known agents as the fatty acid soap of ethylene diamine, marketed by National Oil Products under the trade name "Nopco—DPM."

We claim:

1. The method of treating a normally gaseous hydrate-forming fluid that includes passing a stream of said fluid together with water-containing liquid through an elongated passage of relatively small cross-sectional area at a rate such that said stream fills said passage and assumes turbulent flow therein, the ratio of said liquid to said hydrate-forming fluid being such that the liquid forms a continuous phase throughout said passage and said fluid forms a dispersed phase therein, maintaining said stream at temperature and pressure conditions causing said hydrate-forming fluid to be converted to solid hydrate particles which are entrained by said stream, and discharging the stream from said passage and separating the hydrates from said discharged stream.

2. The method of treating a normally gaseous hydrate-forming fluid that includes passing a stream of said fluid together with a water-containing non-aqueous carrier liquid through an elongated passage of relatively small cross-sectional area at a rate such that said stream fills said passage and assumes turbulent flow therein, the ratio of said liquid to said hydrate-forming fluid being such that the liquid forms a continuous phase throughout said passage and said fluid forms a dispersed phase therein, maintaining said stream at temperature and pressure conditions causing said hydrate-forming fluid to be converted to solid hydrate particles which are entrained by said carrier liquid, and discharging the stream from said passage and separating the hydrates from said discharged stream.

3. The method of treating a normally gaseous hydrate-forming fluid that includes passing a stream of said fluid together with a water-containing petroleum fraction carrier liquid through an elongated passage of relatively small cross-sectional area at a rate such that the stream fills said passage and assumes turbulent flow therein, the ratio of said liquid to said hydrate-forming fluid being such that the liquid forms a continuous phase throughout said passage and said fluid forms a dispersed phase therein, maintaining said stream at temperature and pressure conditions causing said hydrate-forming fluid to be converted to solid hydrate particles which are entrained by said stream, and discharging the stream from said passage and separating the hydrates from said discharged stream.

4. The method of treating a normally gaseous hydrate-forming fluid that includes passing a stream of said fluid together with water emulsified with a water-immiscible carrier liquid through an elongated passage of relatively small cross-sectional area at a rate such that the stream fills said passage and assumes turbulent flow therein, the ratio of said liquid to said hydrate-forming fluid being such that the liquid forms a continuous phase throughout said passage and said fluid forms a dispersed phase therein, maintaining said stream at temperature and pressure conditions causing said hydrate-forming fluid to be converted to solid hydrate particles which are entrained by said stream, and discharging the stream from said passage and separating the hydrates from said discharged stream.

5. The method of treating a normally gaseous hydrate-forming fluid that includes passing a stream of said fluid together with water-containing liquid through an elongated passage of relatively small cross-sectional area at a rate such that the stream fills said passage and assumes turbulent flow therein, the ratio of said liquid to said hydrate-forming fluid being such that the liquid forms a continuous phase throughout said passage and said fluid forms a dispersed phase therein, maintaining said stream at temperature and pressure conditions causing said hydrate-forming fluid to be converted to solid hydrate particles which are entrained by said stream, cooling said stream, and discharging the stream from said passage and separating the hydrates from said discharged stream.

6. The method of treating a normally gaseous hydrate-forming fluid that includes passing a stream of said fluid together with water-containing liquid through an elongated passage of relatively small cross-sectional area at a rate such that the stream fills said passage and assumes turbulent flow therein, the ratio of said liquid to said hydrate-forming fluid being such that the liquid forms a continuous phase throughout said passage and said fluid forms a dispersed phase therein, maintaining said stream at temperature and pressure conditions causing said hydrate-forming fluid to be converted to solid hydrate particles which are entrained by said stream, cooling said stream by introducing a cooling fluid thereto, and discharging the stream from said passage and separating the hydrates from said discharged stream.

7. The method of treating a normally gaseous hydrate-forming fluid that includes passing a stream of said fluid together with water-containing liquid through an elongated passage of relatively small cross-sectional area at a rate such that the stream fills said passage and assumes turbulent flow therein, the ratio of said liquid to said hydrate-forming fluid being such that the liquid forms a continuous phase throughout said passage and said fluid forms a dispersed phase therein, maintaining said stream at temperature and pressure conditions causing said hydrate-forming fluid to be converted to solid hydrate particles which are entrained by said stream, introducing to said stream a hydrate carrier fluid, and discharging the stream from said passage and separating the hydrates from said discharged stream.

8. The method of treating normally gaseous hydrate-forming fluid that includes passing a stream of said fluid together with water-containing liquid through an elongated passage of relatively small cross-sectional area at a rate such that the stream fills said passage and assumes turbulent flow therein, the ratio of said liquid to said hydrate-forming fluid being such that the liquid forms a continuous phase throughout said passage and said fluid forms a dispersed phase therein, maintaining said stream at temperature and pressure conditions causing said hydrate-forming fluid to be converted to solid hydrate particles which are entrained by said stream, introducing to successive locations in said stream a cool water-immiscible hydrate carrier liquid, and discharging the stream from said passage and separating the hydrates from said discharged stream.

9. The method of treating a normally gaseous hydrate-forming fluid that includes passing a stream of said fluid together with water-containing liquid through an elongated passage of relatively small cross-sectional area at a rate such that the stream fills said passage and assumes turbulent flow therein, the ratio of said liquid to said hydrate-forming fluid being such that the liquid forms a continuous phase throughout said passage and said fluid forms a dispersed phase therein, maintaining said stream at temperature and pressure conditions causing said hydrate-forming fluid to be converted to solid hydrate particles which are entrained by said stream, injecting into successive locations in said stream a hydrate carrier mineral oil cooled to a temperature below the freezing temperature of water, and discharging the stream from said passage and separating the hydrates from said discharged stream.

10. The method of treating a normally gaseous hydrate-forming fluid that includes passing a stream of said fluid together with water-containing liquid through an elongated passage of relatively small cross-sectional area at a rate such that the stream fills said passage and assumes turbulent flow therein, the ratio of said liquid to said hydrate-forming fluid being such that the liquid forms a continuous phase throughout said passage and said fluid forms a dispersed phase therein, introducing water to the stream at successive locations therein, maintaining said stream at temperature and pressure conditions causing said hydrate-forming fluid to be converted to solid hydrate particles which are entrained by said stream, and discharging the stream from said passage and separating the hydrates from said discharged stream.

11. The method of treating a normally gaseous hydrate-forming fluid that includes passing a stream containing said fluid together with water-containing liquid through an elongated passage of relatively small cross-sectional area at a rate such that the stream fills said passage and assumes turbulent flow therein, the ratio of said liquid to said hydrate-forming fluid being such that the liquid forms a continuous phase throughout said passage and said fluid forms a dispersed phase therein, maintaining said stream at temperature and pressure conditions causing said hydrate-forming fluid to be converted to solid hydrate particles which are entrained by said stream, discharging the stream from said passage, separating the hydrates from said discharged stream, separating residual water from said discharged stream, and admixing the separated water with the first named stream.

12. The method of treating a normally gaseous hydrate-forming fluid that includes passing a stream containing said fluid together with water and a non-aqueous carrier liquid through an elongated passage of relatively small cross-sectional area at a rate such that the stream fills said passage and assumes turbulent flow therein, the ratio of said liquid to said hydrate-forming fluid being such that the liquid forms a continuous phase throughout said passage and said fluid forms a dispersed phase therein, maintaining said stream at temperature and pressure conditions causing said hydrate-forming fluid to be converted to solid hydrate particles which are entrained by said stream, discharging the stream from said passage, separating the hydrates from said discharged stream, separating the carrier liquid from said discharged stream, and admixing the separated carrier liquid with the first named stream.

13. The method of treating a normally gaseous hydrate-forming fluid that includes passing a stream containing said fluid together with water and a non-aqueous carrier liquid through an elongated passage of relatively small cross-sectional area at a rate such that the stream fills said passage and assumes turbulent flow therein, the ratio of said liquid to said hydrate-forming fluid being such that the liquid forms a continuous phase throughout said passage and said fluid forms a dispersed phase therein, maintaining said stream at temperature and pressure conditions causing said hydrate-forming fluid to be converted to solid hydrate particles which are entrained by said stream, discharging the stream from said passage, separating the hydrates from said discharged stream, separating the carrier liquid from said discharged stream, cooling the separated carrier liquid to aid in maintaining temperature conditions in the first named stream suitable for hydrate formation, and admixing the cooled carrier liquid with said first named stream.

14. The method of treating a normally gaseous hydrate-forming fluid that includes subjecting said fluid to conversion into solid hydrates by forming a mixture of the fluid with water and a carrier liquid, passing a stream of said mixture in heat transferring relationship with previously formed hydrates to aid in decomposing the hydrates and to cool said stream, then subjecting the stream of said mixture to pressure and temperature conditions at which said hydrates will form, and separating the hydrates from the carrier liquid.

15. The method of treating a normally gaseous hydrate-forming fluid that includes continuously passing a stream of said fluid into a conversion zone and therein converting the fluid to solid hydrates under temperature and pressure conditions causing formation of the hydrates, compensating for heat of formation of the hydrates by introducing to said zone a liquid carrying particles of ice, and removing the hydrates from said zone in a stream of said liquid.

16. The method of treating a normally gaseous hydrate-forming fluid that includes continuously passing a stream of said fluid into a conversion zone and therein converting the fluid to solid hydrates under temperature and pressure conditions causing formation of the hydrates, compensating for heat of formation of the hydrates by introducing to said zone a mineral oil carrying particles of ice, and removing the hydrates from said zone in a stream of said mineral oil.

ARTHUR J. L. HUTCHINSON.
IRA C. BECHTOLD.